United States Patent [19]
Cachat

[11] 3,789,180
[45] Jan. 29, 1974

[54] MODIFIED INDUCTOR FOR INDUCTIVELY HEATING VALVE SEATS

[75] Inventor: John F. Cachat, Cleveland, Ohio

[73] Assignee: Park-Ohio Industries, Inc., Cleveland, Ohio

[22] Filed: Dec. 26, 1972

[21] Appl. No.: 318,260

[52] U.S. Cl. ............................ 219/10.57, 219/10.79
[51] Int. Cl. ................................................ H05b 5/00
[58] Field of Search ........................ 219/10.57, 10.79

[56] References Cited
UNITED STATES PATENTS

| | | | |
|---|---|---|---|
| 3,696,224 | 10/1972 | Lewis | 219/10.57 |
| 3,109,909 | 11/1963 | McBrien | 219/10.79 |
| 3,612,806 | 10/1971 | Lewis et al. | 219/10.79 |
| 3,081,989 | 3/1963 | McBrien | 219/10.79 X |
| 3,562,030 | 2/1971 | Seuleu et al. | 219/10.57 X |
| 2,873,344 | 2/1959 | Kocks et al. | 219/10.79 X |

Primary Examiner—Bruce A. Reynolds
Attorney, Agent, or Firm—Meyer, Tilberry & Body

[57] ABSTRACT

An induction heating device of the type used for inductively heating a valve seat of an internal combustion engine and including a generally circular inductor, means for moving the inductor into coupling relationship with the valve seat and means for energizing the inductor with a high frequency alternating current. There is provided an improvement in this device including a positioning of a mechanically permeable element generally coextensive with the inductor and on the side of the inductor opposite to the valve seat. This improvement is beneficial when the valve seat is formed by a ferrous insert within a non-ferrous engine component.

3 Claims, 4 Drawing Figures

PATENTED JAN 29 1974 3,789,180

MODIFIED INDUCTOR FOR INDUCTIVELY HEATING VALVE SEATS

The present invention relates to the art of induction heating and more particularly to a modification of an inductor for inductively heating the valve set of an internal combustion engine.

The invention is particularly applicable for inductively heating the valve seat of an internal combustion engine preparatory to quench hardening, and it will be described with particular reference thereto; however, it is appreciated that the invention has much broader applications and may be used in various other situations where conical surfaces are to be inductively heated by a circular inductor.

With the advent of low lead gasoline to be used in internal combustion engines, it has become necessary to harden the valve seats of the engines so that they will not experience excessive wear during use. The most successful and commonly used valve seat hardening machine is disclosed in prior application Ser. No. 151,493, now U.S. Pat. No. 3,743,809, filed June 9, 1971, and entitled Method and Apparatus for Inductively Heating Valve Seats. This prior application is incorporated by reference herein and made a part hereof. In the prior patent application, the conical valve seat of an internal combustion engine is heated inductively by a generally circular inductor supported on a carrier which is movable between a remote position and a heating position. The carrier is connected to the secondary of a transformer which secondary is movable with respect to the primary of the transformer to allow movement of the inductor by its carrier. In the prior apparatus, the inductor is formed by a rectangular copper tubing secured onto the carrier in a manner so that a flat surface of the inductor is parallel to the valve seat being heated.

Some engine heads are produced from a non-ferrous material, such as aluminum. These heads have presented certain difficulties in producing valve seats having the desirable wear characteristics. The aluminum did not have the inherent wear characteristics of a cast iron head in the area of the valve seats. Consequently, it has been somewhat common to affix a cast iron insert, in the form of a ring, in the aluminum head to provide a cast iron valve seat surface. These cast iron inserts solved the problem created by the low wear resistance of aluminum. It was felt that this same apparatus, as disclosed in the prior patent application, could be employed for inductively heating the cast iron insert of an aluminum head; however, it was found that the heating operation did not provide the necessary heating pattern to give satisfactory hardening. When the use of low lead gasoline required the hardening of the cast iron valve seats in a conventional engine head, the apparatus of the prior application was adopted for hardening the valve seats. To overcome this problem it has been suggested that the valve seats be formed from larger inserts. It was thought that these inserts would take on the characteristics of a cast iron structure and thus be processed in accordance with the process found successful in a wholly cast iron structure. However, this procedure required substantial modifications in the engine design, was expensive and was not acceptable to the automotive industry. The present application is directed toward a modification of the inductor illustrated in the prior patent application mentioned above which modification allows heating of a standard relatively small cast iron insert of the type used as the valve seat of an engine head formed primarily of cast aluminum.

In accordance with the present invention, the inductor as described above is provided with a magnetically permeable element coextensive with the inductor and generally between the inductor and the carrier. This high permeability element causes the current flow within the inductor to be shifted in an outward direction to provide the necessary heating pattern within the cast iron insert of an aluminum engine head. This has proven successful in the induction heating and subsequent quench hardening of the somewhat standard cast iron inserts used for aluminum engine heads.

The primary object of the present invention is the provision of a modified inductor for use in inductively heating the conical surface of a valve seat formed by a cast iron insert supported within an electrically conductive engine component, which modification allows the proper heating pattern to be developed within the insert to develop the necessary heating for subsequent quench hardening.

Another object of the present invention is the provision of a modified inductor of the type described above which is relatively inexpensive and can be incorporated within a standard machine for inductively heating valve seats of an engine component preparatory to quench hardening.

These and other objects and advantages will become apparent from the following description, taken together with the accompanying drawings, in which.

Figure 1:
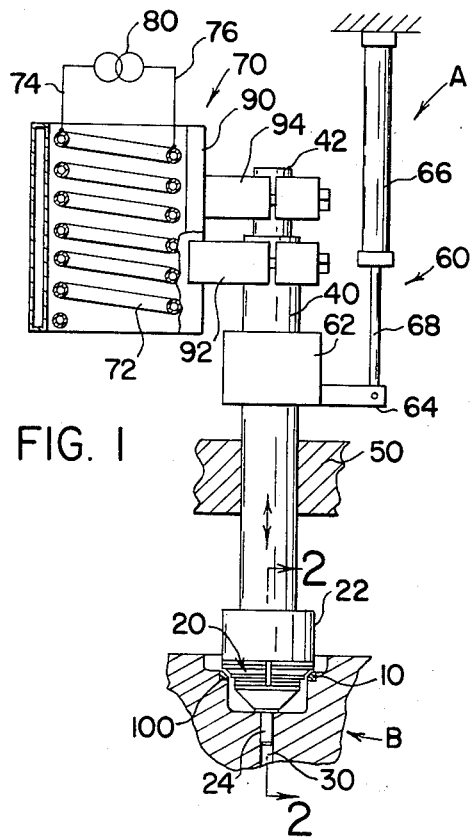
FIG. 1 is a side elevational view showing, somewhat schematically, the environment of the present invention.
Figure 2:
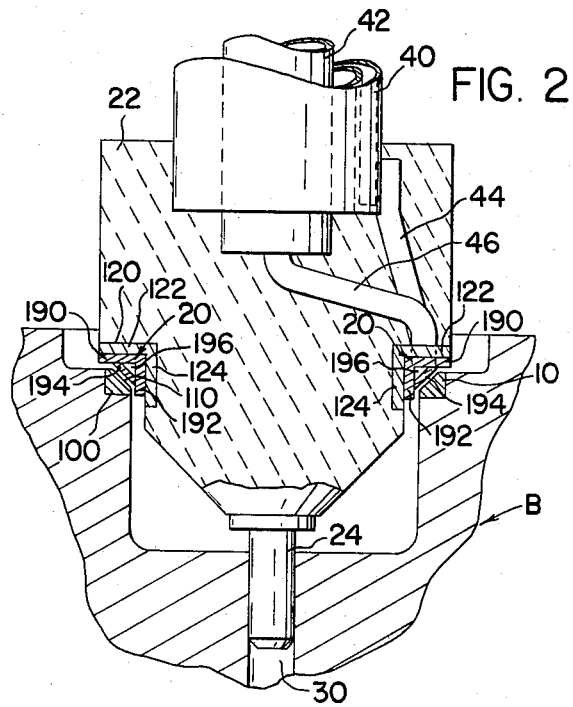
FIG. 2 is an enlarged cross-sectional view taken generally along line 2—2 of FIG. 1 and showing the preferred embodiment of the present invention.

Referring now to the drawings wherein the showings are for the purpose of illustrating a preferred embodiment of the invention only and not for the purpose of limiting same, FIG. 1 schematically illustrates an apparatus A for inductively heating a valve seat 10 in an engine component B. This apparatus has the basic features disclosed in prior application Ser. No. 151,493, now U.S. Pat. No. 3,743,809, filed June 9, 1971. For the purpose of explaining the present invention, the apparatus is schematically illustrated as including a circular inductor 20 supported on a carrier 22 for axial movement with respect to the conical surface of a valve seat. Carrier 22 includes a lower nose 24 adapted to be received within bore 30 of workpiece B for centering the inductor 20 with respect to the valve seat 10 when in its proper heating position, as best shown in FIG. 2. For the purpose of energizing the inductor, telescoping tubular, hollow conductors 40, 42 support the carrier 22, which is basically formed from an electrically non-conductive material, and are connected to the inductor 20 by appropriate leads 44, 46, best shown in FIG. 2. These leads provide an electrical circuit around the inductor 20 for the purpose of inductively heating the valve seat 10 when alternating, high frequency current is directed to the conductors 40, 42. The reciprocal movement of carrier 22 along the axis of the conical valve seat 10 may be controlled by a variety of structures, one of which is schematically represented as a guide means 50 through which general vertical movement of the telescoping conductors 40, 42 is allowed. Sufficient movement is allowed by the guide means for centering of the inductor by nose 24 in bore 30. The carrier 22 is movable between an upper remote position and a lower heating position, generally shown in FIGS. 1 and 2. This movement may be accomplished by a variety of structures, one of which is illustrated in the prior patent application Ser. No. 151,493 filed June 9, 1971. In accordance with the schematic illustration of FIG. 1, the moving means 60 includes a clamp 62 secured onto conduit 40 and having an outwardly extending arm 64 connected onto a cylinder 66. Movement of the rod 68 extending from cylinder 66 shifts the carrier 22 within guide means 50.

The telescoped tubular conductors 40, 42 receive energy from a transformer 70 and direct the high frequency current from the transformer around the inductor 20 for the purpose of heating seat 10 preparatory to hardening. In accordance with the illustrated embodiment of the invention, transformer 70 includes a generally fixed primary winding 72 connected by leads 74, 76 with a high frequency power supply, schematically illustrated as oscillator 80. Of course, the primary winding may form a part of the tank circuit of oscillator 80. To allow for reciprocation of the carrier 22, a secondary winding 90 is movably received around the primary winding 72. The secondary winding includes terminals 92, 94 which are electrically connected with the tubular conductors 40, 42, respectively.

Figure 3:
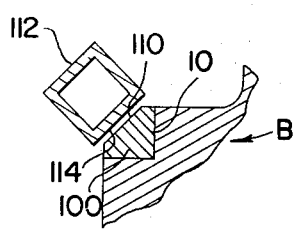
FIG. 3 is a partial cross-sectional view showing the prior art to which the present invention is directed; and, FIG. 4 is a combined view illustrating the operating characteristics of the present invention.

As so far described, the apparatus A works basically in accordance with the prior valve seat hardening apparatus. When this apparatus is used for processing a head B formed out of aluminum, the valve seat 10 is generally formed from a cast iron insert 100 having an inwardly facing conical surface 110 which forms the actual valve seat for the poppet valve of the engine. The insert is used because the aluminum can not provide the necessary wear resistant characteristic for a valve seat. When the prior apparatus was to be used for inductively hardening the insert 100, the process would involve an inductor 112 having a flat surface 114 generally parallel with the seat surface 110. This prior art arrangement is illustrated in FIG. 3. The inductor 112 is energized by a radio frequency power supply generally in the range of over 200 Hertz. When such high frequency is introduced through the inductor 112, the inductor reacts with the aluminum forming the engine component B in a manner similar to two parallel electrical conductors having low resistance and energized with a high frequency. The current flow caused by the interaction of the adjacent conductor forces the actual current flow apart in both parallel conductors. In other words, the current flow in the inductor 112 is forced toward the inside diameter by the reaction of the high frequency current flow with the aluminum of workpiece B. This also forces the current flow within the workpiece to be too deep for heating the insert properly. This phenomenon, which occurs when two conductors are parallel to each other and conduct radio frequency current, prevents accurate and desirable heating of the insert 100. The insert has an insufficient amount of mass to respond as a cast iron workpiece would respond.

This difficulty has been overcome by the present invention which relates to an element having high magnetic permeability, such as bonded ferrite or ferricon, which element is placed on the inside surface of the inductor 20, as shown in FIG. 2. This element is in the form of a ring 120 having a generally L-shaped cross-section and including a generally horizontal leg 122 and a generally vertical leg 124. These legs wrap around the inductor 20 for the purpose of forcing the current flow outwardly toward the insert 100. When the current flow is forced outwardly toward the insert, the magnetic coupling and heating pattern within the insert is increased to a sufficient amount for inductively heating the insert to a quench hardened temperature.

Figure 4:
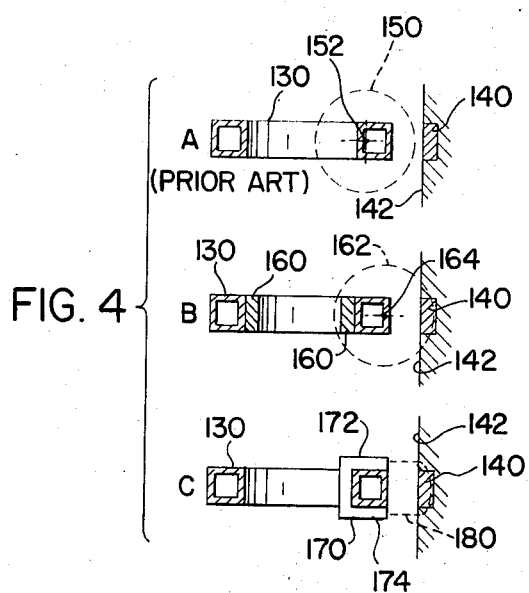

The operational concept of the present invention is schematically illustrated in FIG. 4 having three separate examples A, B and C. In Example A, which is the prior art without a high permeability insert, the inductor 130 is positioned adjacent a cast iron insert 140 supported within aluminum mass 142. When the inductor is energized by high frequency power source, a field 150 is created by a current flow having a center 152. It is noted that the current center is spaced inwardly of the inductor 130 because of the relatively high mass of the aluminum which creates a condition similar to two concentric rings of highly conductive material. This situation forces the current flow outwardly because of the interaction between the two highly conductive materials. Consequently, the flux field 150 does not sufficiently penetrate the insert 140 for the purpose of heating the same to a hardening temperature. Example B shows one aspect of the present invention wherein a high permeability ring 160 is positioned on the inner surface of inductor 130. This forces the flux field 162 outwardly from the inductor 130 to create a current flow center 164 adjacent the outside portion of the inductor. This allows more concentrated heating of the insert 140 within aluminum base 142. An even more pronounced heating can be accomplished by placing a U-shaped ring 170 around the inductor 130 as shown in Example C. This causes a concentration of the flux field 180 by the high permeability flux concentrator 170 having legs 172, 174. The flux is directed by the legs toward insert 140 in aluminum base 142. This further increases the heating by the inductor 130. Of course, the U-shaped flux concentrator 170 extends completely around inductor 130. These examples illustrate the principle creating the advantageous operating characteristics of the ring 120. First the ring forces the center of current flow in inductor 130 outwardly toward the valve seat, as shown in Example B of FIG. 4. In addition, the legs 122, 124 of element 120 concentrate the flux from the inductor so that it is localized in the general area of the insert 100, as shown in Example C of FIG. 4.

In accordance with another aspect of the present invention, the rectangular conductor 112, as shown in FIG. 3 is modified as shown in FIG. 2. The horizontal ring 190 is combined with a vertical ring 192 to provide a recess facing diagonally toward the insert 100 and closed by a conical plate or ring 194 to define an internal coolant circulating passage 196. By this construction, the inductor 20 can be water cooled, but need not require the large space of a rectangular conductor, such as that shown in FIG. 3. This allows accurate positioning of the plate or ring 194 in a parallel relationship with the surface 110 of insert 100 and provides sufficient mass for the current to be carried without requiring the space used for a rectangular type of conductor. In addition, only three elements are used in making this particular inductor while four elements are required in the prior art. This reduces the amount of material and the assembly procedure.

Having thus defined my invention, I claim:

1. In an induction heating device for heating the generally conical surface of an internal combustion engine component, said surface having a central axis, said device comprising a generally circular inductor generally concentric with said axis and matching said surface, means for moving said inductor in the direction of said axis between a remote position and a heating position with said inductor magnetically coupled with said surface, and power means for energizing said inductor with a high frequency alternating current, the improvement comprising: said inductor including a generally L-shaped cross-sectioned conductive ring having a generally vertical leg, a generally horizontal leg and an outwardly facing recess and a generally flat conductive closure ring supported in said recess and extending between said legs to form an internal coolant passage, said flat closure ring having an angle generally matching said conical surface.

2. The improvement as defined in claim 1 including a magnetically permeable ring secured to at least one of said legs and on the side of said one leg opposite to said flat ring.

3. The improvement as defined in claim 2 including a second magnetically permeable ring secured to the other of said legs and on the side of said other leg opposite to said flat ring.

* * * * *